Figures 1, 2:
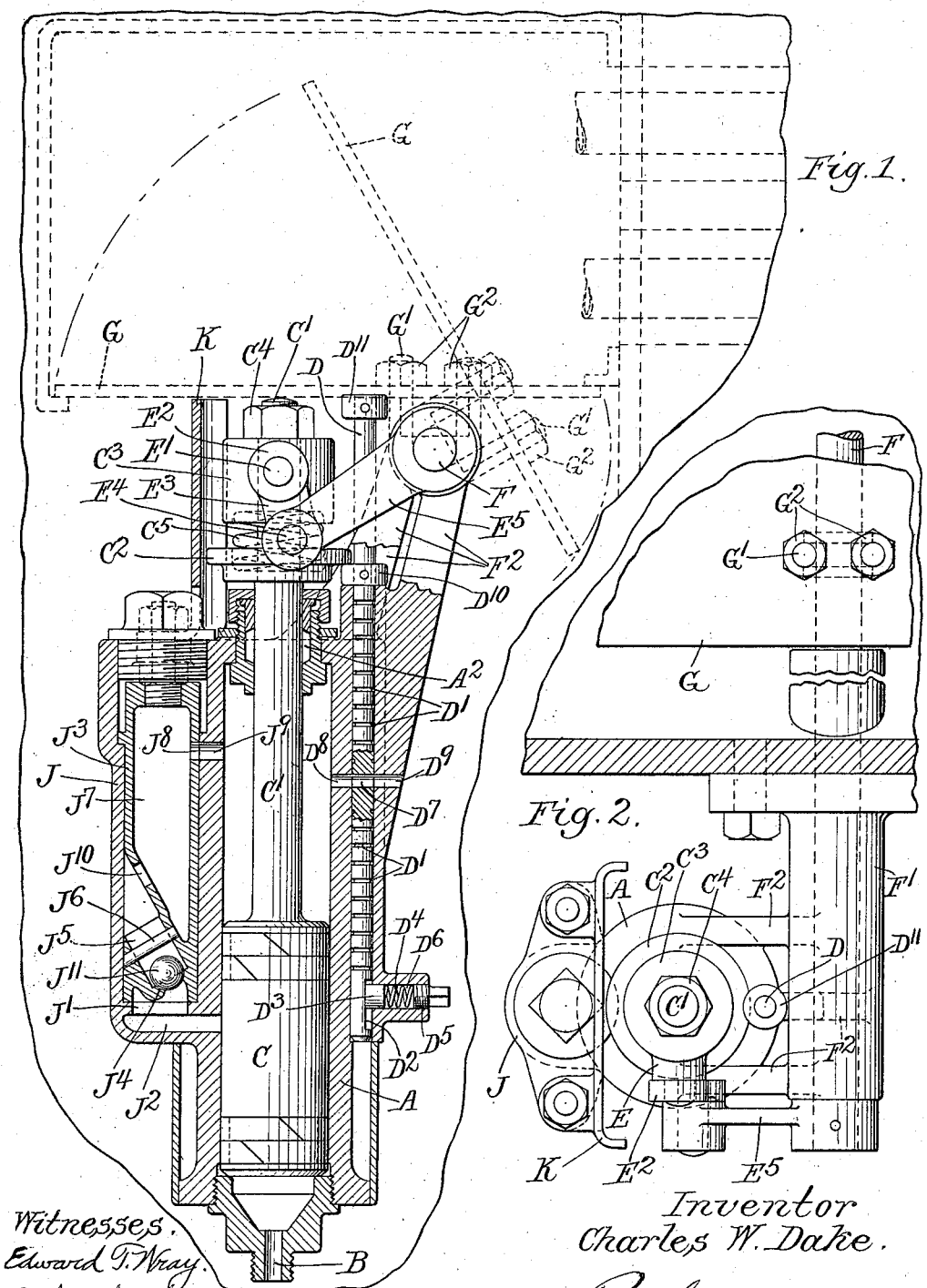

C. W. DAKE.
DAMPER CONTROLLER.
APPLICATION FILED AUG. 4, 1916.

1,298,904.

Patented Apr. 1, 1919.

Witnesses
Edward T. Wray
Esther Van Frank

Inventor
Charles W. Dake.
by Parker & Carter
Attorneys.

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

DAMPER-CONTROLLER.

1,298,904.

Specification of Letters Patent.

Patented Apr. 1, 1919.

Application filed August 4, 1916. Serial No. 113,032.

*To all whom it may concern:*

Be it known that I, CHARLES W. DAKE, a citizen of the United States, residing at Chicago, in the county of Cook and State of Illinois, have invented a certain new and useful Improvement in Damper-Controllers, of which the following is a specification.

My invention relates to means for controlling a damper, particularly the damper intended to be manipulated for the purpose of controlling the flow of hot gases along the superheater tubes of a locomotive boiler. One form of my invention is illustrated in the accompanying drawings, wherein—

Figure 1 is a vertical cross sectional view of the damper control device;

Fig. 2 a plan view thereof.

I show the smoke-box, boiler and flues diagrammatically only because the application of the device here illustrated will be obvious.

Like parts are indicated by the same letter in all the figures.

A is a cylinder casing suitably secured preferably to the outside of the locomotive boiler.

B is a steam inlet suitably provided with steam from the boiler.

C is a piston inside the casing A and adapted to be operated by the steam. It is mounted on the piston rod $C^1$ which passes through the stuffing box $A^2$, and carries at its upper end the flange $C^2$ rigid on the piston rod and the flange $C^3$ slidable therealong, and the nut $C^4$ which limits the upward motion of the head $C^3$. Between the flange $C^2$ and the head $C^3$ is the cushioning spring $C^5$.

D is a rod valve having the annular chambers $D^1$ thereabout to furnish a water seal, and the slot $D^2$ to receive the lock plug $D^3$ associated with the spring $D^4$ and the set screw $D^5$ in the pocket $D^6$. $D^7$ is a transverse aperture in the rod valve adapted when in the proper position to register with the openings $D^8$ and $D^9$, so that the steam from within the case above the piston may be discharged. $D^{10}$ and $D^{11}$ are collars rigidly secured on the rod valve.

E is a lateral projection on the head $C^3$ provided with the projecting pin $E^1$ on which is mounted the collar $E^2$ on the short arm $E^3$ pivotally connected at $E^4$ to the long arm $E^5$ which is mounted on the end of the shaft F. This shaft is mounted in the bearing $F^1$ on the supports $F^2$, $F^2$, which rise from the cylinder casing.

G is a damper plate mounted by means of the yoke $G^1$ and the nuts $G^2$, $G^2$ on the shaft F.

J is a pocket on the side of the cylinder casing, provided at its bottom with an inlet $J^1$ which opens into the channel $J^2$ which leads through the side of the cylinder casing into the piston chamber. $J^3$ is a valve device in the pocket. It contains a valve seat $J^4$, a raceway $J^5$, a pin $J^6$, a chamber $J^7$, a passageway $J^8$, which registers with a passageway $J^9$ in the cylinder casing, which leads into the cylinder chamber above the piston. It also has a passage $J^{10}$. $J^{11}$ is a ball valve on the raceway adapted to rest on the valve seat.

K is a shield plate mounted on the cylinder casing in front of the head when the latter is at its lower position.

Some of the minor parts of the structure I have not illustrated or described as they are easily understood from the drawings.

While I describe a working structure, I wish my drawings to be taken as in a sense diagrammatic, because it is perfectly obvious that great changes in form, structure, proportion and relation of the several parts could be made without departing from the spirit of my invention. Moreover some elements or features could be dispensed with without interfering with the function or mode of operation of the others, and substitutes could be made for some of the features here illustrated.

The use and operation of my invention are as follows:—

The apparatus as I have described it is mounted on the exterior of the boiler, the shield plate interposed between the eye of the engineer and the head or moving part of the damper. The shaft F passes through the locomotive boiler casing into or near the smoke-box and is connected with the damper which controls the opening into that portion of the smoke-box with which the superheater tubes are connected. When the damper is in the closed position as indicated in Fig. 1, the products of combustion cannot pass along the superheater tubes, but when the damper is in the open position as indicated by dotted lines in Fig. 1, the gases are free to pass along the superheater tubes. The apparatus illustrated is intended to control this damper for the purpose in question, and particularly to close the damper to prevent the flow of such gases at the predetermined moment.

Assuming that the parts are in the position indicated in full lines in Fig. 1 with the damper closed, the gases will be prevented from passing along the superheater tubes. If now steam be turned into the bottom of the cylinder casing at B, it will cause the piston C to rise and the head also will rise being elastically or yieldingly supported by the spring. The head will pass upwardly beyond the shield plate and rotate the rod F so as to bring the damper indicated in the dotted lines into its open position, whereupon the gases will be free to pass along the superheater tubes. This action will be permitted because there will be no steam in the piston chamber above the piston, for in the position referred to the passageways $J^8$, $D^7$ and $D^9$ register so that the piston chamber will be open to the atmosphere. As the piston rises it will carry with it the collar or flange $C^2$, and this flange in due time will contact the lower edge of the collar $D^{11}$ on the rod thereof and lift the rod to break the register between the passage $D^7$, $D^8$ and $D^9$. About that time the lower end of the cylinder will have passed the passageway $J^2$ and the steam will enter that passageway, lift the ball valve, and find its way into the upper part of the cylinder. The pressure being the same on both sides of the piston, the piston rod will remain in the elevated position with the damper open. The head, which is preferably painted red, or some other easily observed color, being pushed up beyond the shield, advises the engineer of the fact that the damper is open. The apparatus remains in this condition so long as the steam is flowing. When the steam is cut off, the pressure beneath the piston is reduced. The excess pressure above the piston immediately seats the ball valve and forces the piston down, restoring the parts to the position indicated in Fig. 1.

By this device, therefore, so long as the steam is flowing, the damper is kept in open position, and the engineer is advised of that fact because he can see the head in its elevated position. As soon as the steam is cut off and ceases to flow, the damper is automatically thrown into the closed position and the engineer is advised of this fact because he can no longer see the head.

The operation may be briefly restated as follows:—

The flowing steam first moves the piston until the damper is open and the rod valve has been raised to close the discharge from the outlet side of the piston, then the steam flows to the outlet side of the piston until the pressure is equalized on both sides of the piston. When the steam ceases to flow, the pressure at the inlet side of the piston is reduced, the steam in the outlet side of the piston chamber expands, and the piston is forced into the opposite direction until the damper is closed and the rod valve moved to reëstablish the discharge passage from the outlet side of the cylinder to the open air.

I claim:

1. A damper controller comprising a cylinder, a piston therein, a discharge outlet communicating with one side of the piston, connections from the piston to the damper whereby the latter is moved responsive to the movement of the former, means whereby the steam when flowing is supplied to the inlet side of the piston to move the piston to the damper opening position and to close the discharge outlet from the outlet side of the piston, means for supplying such steam to the outlet side of the piston near the limit of its damper opening excursion, and means for discharging the steam from the outlet side of the piston when the latter has moved to the limit of its closing excursion.

2. A damper controller comprising a cylinder, a piston adapted to reciprocate therein a piston rod extending therefrom through one end of the cylinder, operative connections between said piston rod and the damper, the cylinder being provided with a steam inlet at one end and means for introducing steam therethrough, a steam outlet adjacent the other end the cylinder walls being pierced by a steam passage from the inlet to the outlet side of the piston, and a check valve in said passage.

3. A damper controller comprising a cylinder, a piston adapted to reciprocate therein, a piston rod extending therefrom through one end of the cylinder, operative connections between said piston rod and the damper, the cylinder being provided with a steam inlet at one end of the piston and means for introducing steam therethrough, a steam outlet adjacent the other end of the cylinder walls being pierced by a steam passage from the inlet to the outlet side of the piston, and a check valve in said passage, the inlet end of said passage being normally covered and uncovered only near the limit of the damper opening excursion of the piston.

4. A damper controller comprising a cylinder, a piston adapted to reciprocate therein, a piston rod extending therefrom through one end of the cylinder, operative connections between said piston rod and the damper, said cylinder being provided at one end with a steam inlet, and means for admitting steam therethrough against one side of the piston, the cylinder wall being pierced by a steam passage from the inlet to the outlet side of the piston, a check valve therein and a steam outlet passage on the side of the piston opposite the steam inlet passage, and a controlling valve in said steam outlet passage.

5. A damper controller comprising a cylinder, a piston adapted to reciprocate therein, a piston rod extending therefrom through one end of the cylinder, operative connections between said piston and the damper, said cylinder being provided at one end with a steam inlet, and means for admitting steam therethrough against one side of the piston, the cylinder wall being pierced by a steam passage from the inlet to the outlet side of the piston, a check valve therein and a steam outlet passage on the side of the piston opposite the steam inlet passage, a controlling valve in said steam outlet passage, and means for opening said valve at the end of the damper closing excursion of the piston.

6. A damper controller comprising a cylinder, a piston adapted to reciprocate therein, operative connections between said piston and the damper, said cylinder being provided with a steam inlet, and means for admitting steam therethrough on one side of the piston, a steam passage from the inlet to the outlet side of the piston, and a steam outlet passage on the side of the piston opposite the steam inlet passage, a controlling valve in said steam outlet passage, and means for closing said valve near the limit of the damper opening excursion of the piston.

7. A damper controller comprising a cylinder, a piston adapted to reciprocate therein, operative connections between said piston and the damper, said cylinder being provided with a steam inlet, and means for admitting steam therethrough on one side of the piston, a steam passage from the inlet to the outlet side of the piston, and a steam outlet passage on the side of the piston opposite the steam inlet passage, a controlling valve in said steam outlet passage, and means for opening said valve near the limit of the damper opening excursion of the piston.

8. A damper controller comprising a cylinder, a piston adapted to reciprocate therein, operative connections between said piston and the damper, the cylinder being provided with a steam inlet, on one side of the piston, and means for admitting steam therethrough, a steam passage from the inlet to the outlet side of the piston, and a steam outlet passage on the side of the piston opposite the steam inlet passage, means for closing said outlet passage, and means for opening said outlet passage near the limit of the damper closing excursion of the piston.

9. A damper controller comprising a cylinder, a piston adapted to reciprocate therein, operative connections between said piston and the damper, the cylinder being provided with a steam inlet on one side of the piston, and means for admitting steam therethrough, a steam passage from the inlet to the outlet side of the piston, and a steam outlet passage on the side of the piston opposite the steam inlet passage, and means for closing said outlet passage near the limit of the damper opening excursion of the piston.

10. A damper controller comprising a cylinder, a piston adapted to reciprocate therein, operative connections between said piston and the damper, the cylinder being provided with a steam inlet on one side of the piston, and means for admitting steam therethrough, a steam passage from the inlet to the outlet side of the piston, and a steam outlet passage on the side of the piston opposite the steam inlet passage, and means for opening said outlet passage near the limit of the damper closing excursion of the piston, and means for closing it near the limit of the damper opening excursion of the piston.

11. A damper controller comprising a cylinder, a piston adapted to reciprocate therein, operative connections between said piston and the damper, a steam inlet passage on one side of the piston and means for introducing steam therethrough, a steam passage from the inlet side of the piston to the outlet side of the piston, said passage normally closed and uncovered only near the limit of the damper opening excursion of the piston, a check valve in said passage, the cylinder being provided with an outlet passage on the outlet side of the piston, a valve therein, and means whereby said valve is opened near the limit of the damper closing excursion of the piston, and closed near the limit of the damper opening excursion of the piston.

12. A damper controller comprising a cylinder, a piston adapted to reciprocate therein, operative connections between the piston and the damper, said cylinder being provided with a steam inlet to one side of the piston, and means for admitting steam therethrough, the cylinder walls containing a passage from the inlet side of the piston to the outlet side of the piston, said passage controlled by a valve actuated by the movement of the piston.

13. A damper controller comprising a cylinder, a piston adapted to reciprocate therein, operative connections between the piston and the damper, said cylinder being provided with a steam inlet to one side of the piston, and means for admitting steam therethrough, the cylinder walls containing a passage from the inlet side of the piston to the outlet side of the piston, said passage controlled by a valve actuated by the movement of the piston, the mouth of said passage being normally closed by the piston, and uncovered only near the limit of the damper opening excursion of the piston.

14. A damper controller comprising a cylinder, a piston adapted to reciprocate therein, operative connections between the piston and the damper, said cylinder being provided with a steam inlet on one side of the piston, and means for introducing steam therethrough, a passage from the inlet side of the piston to the outlet side of the piston, and a steam discharge passage from the outlet side of the piston, said discharge passage controlled by a valve actuated by the movement of the piston.

In testimony whereof, I affix my signature in the presence of two witnesses this 1st day of August, 1916.

CHARLES W. DAKE.

Witnesses:
   MINNIE M. LINDENAU,
   ESTHER VAN FRANK.

Copies of this patent may be obtained for five cents each, by addressing the "Commissioner of Patents, Washington, D. C."